United States Patent Office 2,765,260
Patented Oct. 2, 1956

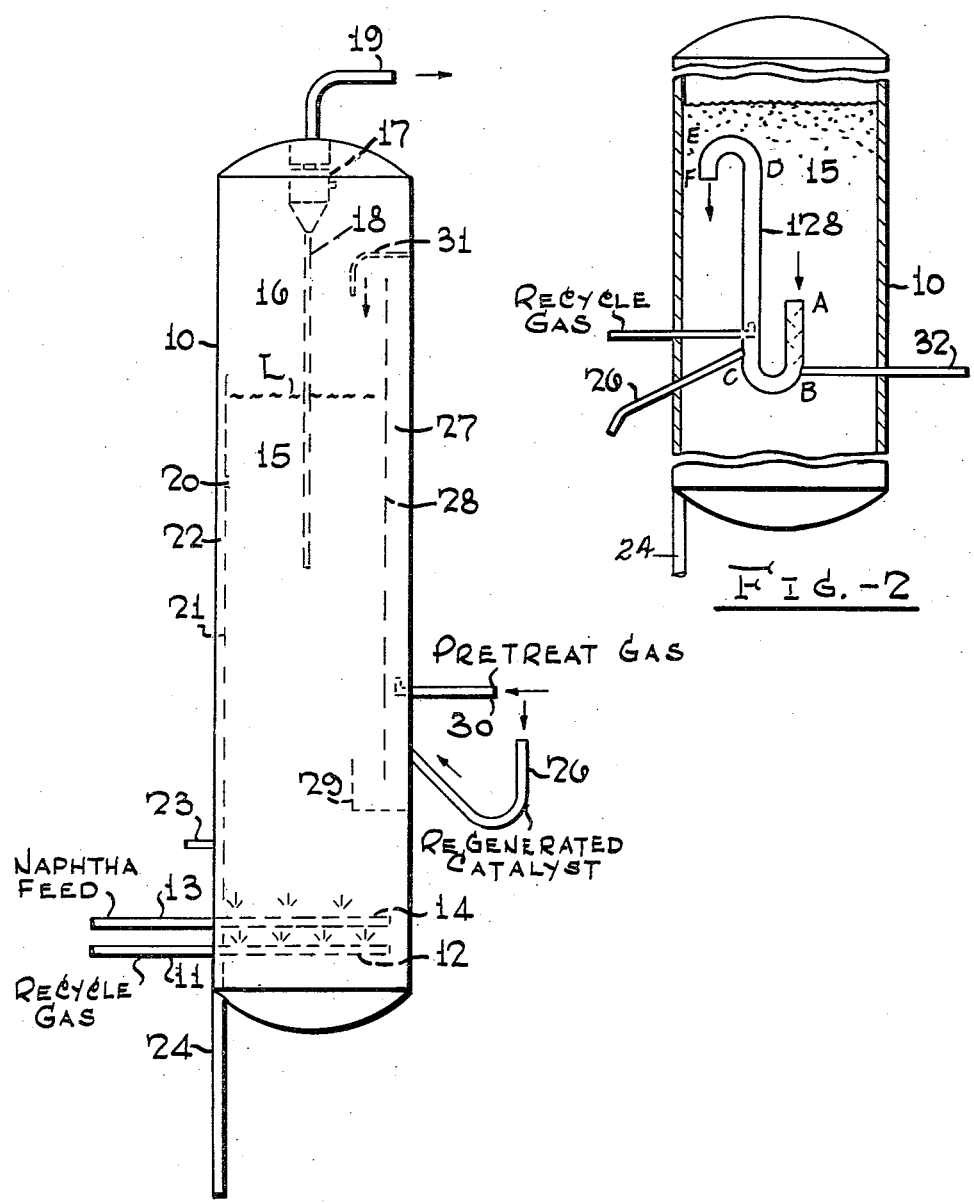

2,765,260

HYDROFORMING PROCESS AND APPARATUS

Richard J. Yoder, Elizabeth, N. J., assignor to Esso Research and Engineering Company, a corporation of Delaware Application August 1, 1952, Serial No. 302,047

5 Claims. (Cl. 196—50)

This invention pertains to the catalytic conversion of hydrocarbons and particularly to a process and apparatus whereby hydrocarbon fractions boiling within the motor fuel range of low knock rating may be converted into high octane number fuels rich in aromatics by hydroforming the same in a fluidized solids reactor system.

It is well known that petroleum naphthas can be subjected to reforming operations to yield liquid products boiling within the motor fuel or gasoline range and possessing improved octane numbers. Reforming operations employing solid catalysts, especially hydroforming and aromatization processes are widely used in the petroleum industry. By hydroforming is ordinarily meant a process wherein hydrocarbon fractions boiling within the motor fuel or naphtha range are treated at elevated temperatures and pressures in the presence of certain solid catalysts and hydrogen whereby the hydrocarbon fraction is increased in aromaticity with no net consumption of hydrogen. The term "aromatization" when used broadly refers to conversions which increase the aromaticity of the hydrocarbon fractions treated. As generally used in the petroleum industry, aromatization is a process in which hydrocarbon fractions are treated at elevated temperatures in the presence of solid catalysts and in the presence or absence of hydrogen, usually at pressures lower than those employed in hydroforming, for the purpose of increasing the aromaticity of the hydrocarbon fractions.

Catalytic reforming processes are usually carried out at temperatures of about 750–1150° F. in the pressure range of about 0–1000 lbs. per sq. inch and in the presence of such catalysts as molybdenum oxide, chromium oxide, tungsten oxide or any of a number of oxides and sulfides of metals of groups IV, V, VI, VII and VIII of the periodic system. These catalytic materials are usually dispersed or supported upon a base or spacing agent. Commonly used spacing agents for this type of catalyst are alumina, either precipitated or of the gel type, activated alumina and zinc aluminate spinel.

It has been proposed in Serial No. 188,236 filed October 3, 1950, now U. S. Patent No. 2,689,823, to effect the hydroforming of naphtha fractions in a fluidized solids reactor system in which naphtha vapors are passed through a dense, fluidized bed of hydroforming catalyst particles in a reaction zone, spent catalyst particles being withdrawn continuously from the dense bed and passed to a separate regeneration zone where inactivating carbonaceous deposits are removed, whereupon the regenerated catalyst particles are returned to the main reactor vessel. Fluid hydroforming as thus conducted has several fundamental advantages over fixed bed hydroforming such as (1) the operations are continuous, (2) the vessels and equipment can be designed for single rather than dual functions, (3) the reactor temperature is substantially constant throughout the fluidized reactor bed, and (4) the regeneration or reconditioning of the catalyst may be readily controlled.

A particular advantage of the foregoing fluid solids operation has been the fact that the freshly regenerated catalyst can be utilized to carry part of the heat required for the hydroforming reaction from the regeneration zone into the reaction zone. It has been proposed in this connection to discharge hot, freshly regenerated catalyst particles from the regenerated catalyst standpipe into a stream of hot hydrogen-rich recycle gas in a transfer line whereby the catalyst particles are subjected to a reconditioning treatment, during their passage through the transfer line into the reaction zone, involving at least a partial reduction of higher oxides of the catalyst metal formed during regeneration to a lower, more active form of oxide of the metal. In view of the high temperature of the freshly regenerated catalyst (1050–1200° F.) and the exothermic character of the reaction between the hot, freshly regenerated catalyst and the hydrogen-rich gas, it is necessary to make the transfer line of small diameter and as short as possible in order to keep the time of contact of the regenerated catalyst and the hydrogen-containing gas sufficiently short to avoid overtreatment and/or thermal degradation of the catalyst.

Operations of this type have, in general, been limited to low catalyst to oil ratios (around 1:1) by selectivity considerations since higher ratios resulted in excessive carbon formation. However, low catalyst to oil ratios limit the transfer of heat from the regenerator to the reactor via the catalyst and make it necessary to provide cooling coils in the regenerator and to provide furnaces or other means for supplying heat to the reactor either directly or indirectly through the reactants and/or the hydrogen-rich recycle gas.

It is the object of this invention to provide a novel process and apparatus for reforming or hydroforming hydrocarbon fractions boiling within the motor fuel range in an advantageous manner by the use of the fluidized solids technique.

It is also the object of this invention to provide a process and apparatus for reforming of hydroforming hydrocarbon fractions by the fluidized solids technique which permits the transfer of a maximum amount of heat from the regenerator to the reactor while reducing or minimizing the danger of degrading the freshly regenerated catalyst during the pretreatment or reduction prior to return thereof to the hydrocarbon conversion or reaction zone.

It is a further object of this invention to provide a process and apparatus for recycling reactor catalyst through the pretreatment zone permitting the entire operation of recycling and pretreating to be carried out within the reactor.

These and other objects will appear more clearly from the detailed specification and claims which follow:

Reference is made to the accompanying drawing in which Figure 1 is a vertical cross section through a reactor in accordance with the present invention and Figure 2 is a vertical cross-section through a modified regenerated catalyst pretreatment zone arranged within a reactor.

Referring to Fig. 1, 10 is a long, vertical shell enclosing the main reaction zone and the pretreating zone. An inlet line 11 is connected to distributor ring 12 for the introduction of preheated hydrogen-rich or recycle gas near the bottom of vessel 10. An inlet line 13 is connected to distributor ring 14 for the introduction of naphtha feed preferably in preheated or vaporized form. Instead of supplying the recycle gas and naphtha feed separately, they can be combined before or after preheating and introduced through a single feed inlet line and distributor ring or other suitable distribution means.

Catalyst is supplied to the reaction zone in finely divided condition and is maintained as a dense, fluidized, liquid-simulating bed 15 having a definite level L by control of the velocity of the gaseous reactant fluids passing upwardly through the vessel. The vaporous reaction products leaving the dense bed 15 entrain a small amount of catalyst particles forming a dilute or disperse phase or suspension designated as 16 in the upper part of the vessel. The reaction products and entrained catalyst particles are taken overhead through separating means 17 arranged in the upper part of the reactor vessel. This separating means 17, which may be a cyclone separator or the like, separates the entrained catalyst fines from the vaporous reaction products. The solid catalyst particles separated in separator means 17 are returned to the dense bed 15 through the dip leg 18 connected to the bottom of the separator. The dip leg 18 extends well below the upper level L of the dense bed 15 and may be provided with valve or damper means and fluidizing gas inlet lines to control the return of recovered catalyst particles to the dense bed. The vaporous reaction products are withdrawn from separating means 17 through outlet line 19 and are passed to suitable product recovery and processing equipment.

Catalyst particles flow from the dense bed 15 through restriction orifice 20 arranged in wall member 21 into the stripping cell or section 22 between wall member 21 and the interior wall of vessel 10. Stripping gas such as steam, natural gas, nitrogen or the like is supplied to the lower portion stripper cell 22 through inlet line 23. The stripping gas passes countercurrent to the descending catalyst particles and strips off entrained or adsorbed hydrogen and light hydrocarbons which pass upwardly into the dilute or disperse phase 16 where they become mixed with the vaporous reaction products. The stripper could also be arranged externally of the reactor vessel in which event suitable connector pipes would be required to supply the spent catalyst thereto and to transfer the off gases from the stripper into the dilute phase 16 or into product outlet line 19.

The stripped spent catalyst particles are discharged from the bottom of the stripper into a standpipe 24 and thence into a transfer line where the catalyst particles are picked up by an air stream and conveyed to a separate regeneration zone where the inactivating carbonaceous deposits are burned off, preferably in a dense, fluidized bed similar to bed 15 in the reaction zone. The regenerated catalyst particles are withdrawn from the regeneration zone, preferably stripped with nitrogen or scrubbed flue gas preparatory to recycling to the reaction zone.

The regenerated catalyst preferably after stripping is returned to the reactor through a dense phase transfer line or through a U-bend transfer line 26 which acts as a seal between the reactor and the regenerator. The regenerated catalyst particles flow through a reverse standpipe into the pretreating section 27 of the reactor. The pretreating section comprises a vertical baffle member 28 that extends above the maximum bed level L in the reactor and has its lower end extended into the seal baffle or pot 29. Pretreating gas, preferably recycle process gas, is supplied to the pretreating section 27 through inlet line 30 in the lower portion of the pretreat section. The dimensions of the pretreat section and the quantity of pretreat gas supplied are such that the density in the pretreat section is less than in the reactor proper. For example, average density in the dense bed 15 may be about 40 lbs./cu. ft. while the density in the pretreat section 27 may be about 20–35 lbs./cu. ft. In view of this difference in density, reactor catalyst flows by static head differential from the dense bed 15 into the lower end of pretreat section 27 where the relatively cool reactor catalyst mixes with the hot, freshly regenerated catalyst thereby cooling the latter. The seal baffle 29 or cut member surrounding the lower end of baffle member 28 prevents reverse flow of catalyst from the pretreater into the reactor section. The mixed catalyst is lifted by the pretreat gas to the top of the vessel where the gas is separated from the catalyst. This separation can be facilitated by providing a baffle member 31 above the outlet end of the pretreat section which deflects the catalyst particles downward toward the dense bed 15 while the off gases from the pretreat section become intermingled with vaporous reaction products and pass to the separator 17. The catalyst in the pretreat section is subject to further cooling by indirect heat exchange between the pretreater and the reactor bed through the separating baffle or wall member 28. This indirect heat exchange can be maximized by increasing the heat transfer area as by making the wall member of undulating cross-section or by affixing vertical fins to one or both sides of the baffle member.

Another form of pretreat chamber is illustrated in Fig. 2. In this embodiment, 10 is the wall of the reactor vessel, 15 is the dense, fluidized bed of catalyst particles and 26 is the line through which regenerated catalyst is supplied to the pretreat chamber similarly to the correspondingly numbered parts of Fig. 1. As in the case of Fig. 1, the line 26 may desirably be a U-bend transfer line which can readily serve to seal off the regenerator from the reactor. The dense phase regenerated catalyst at temperatures of about 1050–1200° F. discharges from transfer line 26 into a pretreatment section or zone 128 within the reactor. The pretreatment section or zone 128 is completely or substantially completely submerged in the dense, fluidized bed 15 and is separated from the main reactor fluidized bed by suitable heat conducting wall members. The pretreatment section may be of a number of shapes but may be readily visualized as three sections of pipe AB, CD and EF, each of which is circular in cross section. The three sections are connected by U-bends ABC and DEF. Section CD is long compared with sections AB and EF.

A small portion of the hydrogen-rich or recycle gas (for example, 2% of total recycle gas used in the reactor) is introduced through line 32 into section AB of the pretreat section. This gas passes upward countercurrent to the reactor catalyst entering AB and hence serves to strip out any naphtha vapors entrained from the reactor bed. Side to side or disc and donut baffles may be provided in section AB in order to improve contact between the catalyst particles and the stripping gas supplied through line 32. Removal of entrained naphtha vapors from the reactor catalyst before it contacts the hot regenerated catalyst prevents or minimizes loss of desirable products due to thermal cracking. The recycle gas thus used for stripping enters the reactor bed at A and then serves a second function of providing a partial pressure of hydrogen along with other recycle gas introduced at the bottom of the reactor.

Reactor catalyst stripped of hydrocarbons and at average reactor temperature of about 875–900° F. passes through the U-bend ABC and contacts the hot regenerated catalyst discharged from line 26 at C. In section CD a further small portion of recycle (for example, about 5% of the total recycle gas as used in the reactor) is introduced to decrease the density in section CD. The quantity of recycle gas and dimensions of CD are such that the density in CD is below that in the main reactor bed and in section AB causing the reactor catalyst to flow through the stripping section AB into section CD where it is mixed with the regenerated catalyst. At substantially constant density in stripping section AB, the quantity of reactor catalyst passing into section CD (and hence the degree of cooling of the regenerated catalyst) is controlled by controlling the quantity of recycle gas introduced to section CD. The greater the quantity of recycle gas added, the lower the density in CD and the greater the flow of reactor catalyst by static head through stripping section AB into and through section CD.

The mixture of spent and regenerated catalyst and recycle gas passes into the reactor bed through the U-bend DEF. The regenerated catalyst first contacts the main reactor bed at point F by which time it has been cooled to 925–950° F. by the reactor catalyst that has been mixed therewith as well as by indirect heat transfer through the walls of the pretreatment zone or section. Since the outlet F of the pretreating section is in the catalyst dense phase or bed 15 and directed downward, the recycle gas enters the reactor bed and is intimately mixed with it. Hence this gas provides a partial pressure of hydrogen in the reactor dense bed as well as the main portion of the recycle gas which enters at the bottom of the reactor.

The temperature of pretreat can be readily controlled by changing the quantity of pretreat gas used. Changes in the quantity of pretreat gases effects changes in the density in the pretreat section and this, in turn, varies the amount of reactor catalyst introduced into the pretreat section because of the static head differential. It may readily be seen, therefore, that the arrangements in accordance with the present invention, provide a means for pretreating freshly regenerated catalyst at a relatively low temperature without loss either of the sensible heat of the regenerated catalyst or the heat of reduction or pretreatment. This is done in an extremely simple and facile manner by recycling a controlled amount of reactor catalyst into the pretreater and pretreating the resultant mixture of reactor and regenerated catalyst in a zone or section entirely within the reactor vessel.

The feed or charging stock to the reforming or hydroforming reaction zone may be a virgin naphtha, a cracked naphtha, a Fischer-Tropsch naphtha or the like having a boiling range of from about 130–430° F., or a narrower boiling fraction within this range such as a 130–185° F. or a 200–330° F. cut. The feed stock is preheated alone or in admixture with hydrogen-rich recycle gas to reaction temperature or to the maximum temperature possible while avoiding thermal degradation of the feed stock. Ordinarily, preheating of the feed stock is carried out to temperatures of about 800–1050° F., preferably about 1000° F. The naphtha preheat can be carried out to high temperatures while avoiding thermal degradation thereof by limiting the time of residence of the feed stock in the preheat furnace and in the transfer and feed inlet lines. The hydrogen-rich or recycle process gas which contains from about 50–80 vol. percent or more of hydrogen, is preheated to temperatures of about 1150–1300° F., preferably about 1200° F. prior to the introduction thereof to the inlet line 11. The recycle gas should be circulated through the reaction zone at a rate of from about 1000 to 8000 cu. ft. per barrel of feed. The amount of recycle gas used is preferably the minimum amount that will suffice to keep carbon formation at a low level.

The reactor system is charged with a mass of finely divided reforming catalyst. Suitable catalysts include Group VI metal oxides such as molybdenum oxide, chromium oxide or tungsten oxide, or mixtures thereof upon a carrier, such as activated alumina, zinc aluminate spinel or the like. Preferred catalysts contain about 5 to 15 wt. percent molybdenum oxide or from about 10 to 40 wt. percent chromium oxide upon a suitable carrier or support. If desired, minor amounts of stabilizers and promoters such as silica, calcium oxide, ceria or potassia can be included in the catalyst. The catalyst particles are, for the most part, between 200 and 400 mesh in size or about 0–200 microns in diameter with a major proportion between 20 and 80 microns.

The reforming reaction zone should be operated at temperatures between 800 and 1050° F. and at pressures between about 5 and 500 lbs. per sq. inch. The particular temperature and pressure used is governed principally by the nature of the feed stock and the nature of the end product desired. For example, a narrow boiling, hexane-rich fraction is preferably reformed in contact with a chromia on alumina or zinc aluminate spinel catalyst at temperatures of about 1000–1025° F. and at pressures of about 10–50 lbs. per sq. inch gauge while a 200–350° F. boiling range naphtha is preferably reformed in contact with a molybdenum oxide-alumina catalyst at temperatures of about 900–925° F. and at pressures of about 200 lbs. per square inch. Lowering reactor pressure results in increased carbon formation while increasing reactor pressure results in an increase in catalyst selectivity to light products ($C_4$'s and lighter). The regenerator zone is normally operated at a temperature of about 1050–1200° F. and at essentially the same pressure as the reactor zone to facilitate catalyst flow between the two vessels or zones. The residence time of the catalyst in the reactor is of the order of from about 0.5 to 5 hours and in the regenerator of from about 3 to 15 minutes although holding times as long as 4 or 5 hours may in some cases be useful as when the feed stock contains appreciable amounts of sulphur. Regeneration is ordinarily conducted with an excess of air or with such amount of air that there will be some free oxygen in the flue gases from the regenerator and the catalytic metal will be converted to a higher oxide during regeneration.

The weight ration of catalyst to oil introduced into the reactor should be about 0.5 to 5.0. Space velocity or the weight in pounds of feed charged per pound of catalyst in the reactor depends upon the age or activity level of the catalyst, the character of the feed stock and the desired octane number of the product. Space velocity for molybdenum oxide-alumina or a chromia-alumina catalyst may vary, for example, from about 1.5 to 0.15 wt./hr./wt. The superficial velocity of the gases and vapors through the main reactor is about 0.3 to about 2.0 feet per second giving a density in the main reactor dense bed 15 of about 30 to 50 lbs. per cu. ft. The superficial velocity of the pretreat gas through the pretreat section 27 should be about 1.0 to 5.0 ft. per second to produce a density of about 15 to 40 lbs. per cu. ft. as desired.

The temperature in the regenerator is maintained between about 1050 and 1200° F., preferably at the maximum temperature that the catalyst can withstand in order that a maximum amount of heat can be transferred to the reaction zone as sensible heat of the regenerated catalyst. The reduction of the higher catalytic metal oxides formed in the regenerator is highly exothermic and results in a substantial temperature rise which may be of the order of about 120° F. The temperature rise is dependent upon the nature of the catalyst, i. e., whether a chromia- or a molybdena-containing catalyst as well as upon the amount of catalytic metal oxide present on the catalyst. Sufficient reactor catalyst is supplied to the pretreatment section or zone so that the mixture of regenerated and reactor catalyst discharged from the pretreatment zone into the reactor dense bed is not more than 100° F. higher than the average reactor dense bed temperature and is preferably only about 50–75° F. higher than the reactor dense bed temperature.

The following example is illustrative of the present invention.

*Example*

A reactor vessel is charged with a molybdenum oxide on alumina catalyst which is maintained at 900° F. and in the form of a dense fluidized bed with a density of 45 lbs. per cu. ft. A pretreating section is provided in the reactor extending from 30 ft. below the top of the dense bed to 10 ft. above the top of the bed. Catalyst is continuously withdrawn from the dense bed, passed to a separate regeneration zone where carbonaceous deposits are burned off at elevated temperatures and recycled to the reactor. In such a system, in which regenerated catalyst at about 1125° F. is discharged to the pretreating section at a rate of 2 tons per minute, the pretreating section should have a cross-sectional area of from 2 to 3 sq. ft.

If it is desired to effect the pretreatment of the catalyst at 950° F. without losing any of the sensible heat, it will be necessary to recycle approximately 7 tons per minute of reactor catalyst at 900° F. through the pretreater for mixing with the 2 tons per minute of regenerated catalyst at 1125° F. The required density of catalyst in the pretreater to cause such a circulation is approximately 34 lbs./cu. ft. This density will be reached in the pretreater if enough pretreating or recycle gas is introduced to give a superficial velocity of approximately 1.5 cu. ft./sec.

If it is desired to effect the pretreatment of the catalyst at 975° F., it would be necessary to circulate about 4 tons per minute of 900° F. reactor catalyst through the pretreater. This circulation rate would be realized by introducing such an amount of pretreating or recycle gas to give a superficial velocity in the pretreater of 1.3 ft. per second.

The foregoing description contains a limited number of embodiments of the present invention. It will be understood that numerous variations are possible without departing from the scope of this invention.

What is claimed is:

1. In a process for reforming hydrocarbons in contact with finely divided reforming catalyst particles consisting essentially of a Group VI metal oxide upon an alumina-containing support at temperatures of about 800° to 1050° F. and at pressures of from 5 to 500 pounds per square inch in accordance with the fluidized solids technique in which a stream of catalyst particles is continuously withdrawn from a dense fluidized bed of catalyst particles in the reactor zone and passed to a separate regeneration zone where carbonaceous deposits are burned from the catalyst at substantially at same pressure as is maintained in the reaction zone and at temperatures between about 1050 and 1200° F. preparatory to recycling the regenerated catalyst particles to the main reactor zone, the improvement which comprises continuously supplying a stream of hot, freshly regenerated catalyst particles to a pretreating zone, continuously supplying reactor catalyst to the pretreating zone to cool the regenerated catalyst particles substantially below regenerator temperature, supplying hydrogen-rich gas to the pretreating zone to reduce higher catalytic metal oxides in the regenerated catalyst to a lower, more catalytically active form of catalytic metal oxide and to lift the mixture of reactor catalyst and regenerated catalyst through the pretreating zone, discharging the resultant mixture into the dilute phase above the reactor dense bed, returning the catalyst particles to the top of the dense bed in the main reactor zone, combining the gas from the pretreating zone with the reaction product vapors and withdrawing the resultant mixture overhead and maintaining dense, fluidized bed of reactor catalyst in contact with the outer wall of the pretreating zone in order to transfer heat from the pretreating catalyst mixture in the zone to the main catalyst dense bed in the reactor zone by indirect heat transfer.

2. In a process for reforming hydrocarbons in contact with finely divided reforming catalyst particles consisting essentially of molybdenum oxide upon an alumina-containing support at temperatures of about 900° to 925° F. and at pressures of about 200 pounds per square inch in accordance with the fluidized solids technique in which a stream of catalyst particles is continuously withdrawn from a dense fluidized bed of catalyst particles in the reactor zone and passed to a separate regeneration zone where carbonaceous deposits are burned from the catalyst at substantially the same pressure as is maintained in the reaction zone and at temperatures between about 1050° and 1200° F. preparatory to recycling the regenerated catalyst particles to the main reactor zone, the improvement which comprises continuously supplying a stream of hot, freshly regenerated catalyst particles to a pretreating zone, continuously withdrawing a stream of catalyst from the reactor dense bed, contacting the stream of reactor catalyst with a stripping agent, introducing the stripped reactor catalyst into said pretreating zone in an amount sufficient to cool the regenerated catalyst particles in the pretreating zone substantially below regenerator temperature, supplying hydrogen-rich gas to the pretreating zone to reduce higher catalytic metal oxides in the regenerated catalyst to a lower, more catalytically active form of catalytic metal oxide and to lift the mixture of reactor catalyst and regenerated catalyst through the pretreating zone, discharging the resultant mixture into the dilute phase above the reactor dense bed, returning the catalyst particles to the top of the dense bed in the main reactor zone, combining the gas from the pretreating zone with the reaction product vapors and withdrawing the resultant mixture overhead and maintaining dense, fluidized bed of reactor catalyst in contact with the outer wall of the pretreating zone in order to transfer heat from the mixture of catalyst in pretreating zone to the main catalyst dense bed reactor zone by indirect heat transfer.

3. A hydroforming reactor comprising in combination a vertical, elongated vessel, inlet lines and distribution means for the introduction of vaporous reactants in the lower part of said vessel, an outlet line extending downwardly from said vessel for the withdrawal of solid particles, an outlet line connected to the top of said vessel for the withdrawal of vaporous reaction products overhead from said vessel, a pretreating chamber arranged within said vessel, comprising a short, lower section, a long, central section and a short, upper section, said short, lower section being connected by a U-bend to the lower end of said long, central section, and said short, upper section being connected by an inverted U-bend to the upper end of said long central section, an inlet line for discharging freshly regenerated catalyst particles from an external source into the lower part of said long central section and an inlet line for the introduction of gas into the said long central section to lift catalyst particles therethrough and to discharge the same through said inverted U-bend and said short, upper section into the upper part of the vessel.

4. The reactor as defined in claim 3 in which an inlet line for the introduction of stripping gas is provided in the lower part of the said short, lower section of the pretreating chamber.

5. The reactor as defined in claim 3 in which an inlet line for the introduction of stripping gas is provided in the lower part of the said short, lower section of the pretreating chamber and baffle members are provided in said short, lower section to increase contact between the catalyst particles and the stripping gas.

References Cited in the file of this patent

UNITED STATES PATENTS

| | | |
|---|---|---|
| 2,363,874 | Krebs | Nov. 28, 1944 |
| 2,378,342 | Voorhees et al. | June 12, 1945 |
| 2,410,891 | Meinert et al. | Nov. 12, 1946 |
| 2,433,726 | Angell | Dec. 30, 1947 |
| 2,436,225 | Ogorzaly et al. | Feb. 17, 1948 |
| 2,468,508 | Munday et al. | Apr. 26, 1949 |
| 2,472,844 | Munday et al. | June 14, 1949 |
| 2,560,403 | Arveson | July 10, 1951 |
| 2,582,711 | Nelson | Jan. 15, 1952 |
| 2,582,712 | Howard | Jan. 15, 1952 |
| 2,700,639 | Weikart | Jan. 25, 1955 |
| 2,710,827 | Gornowski | June 14, 1955 |